(12) United States Patent
Haeno

(10) Patent No.: US 6,487,460 B1
(45) Date of Patent: Nov. 26, 2002

(54) LASER MARKER

(75) Inventor: Makoto Haeno, Tachikawa (JP)

(73) Assignee: Sunx Limited, Aichi (JP)

( * ) Notice: Subject to any disclaimer, the term of this patent is extended or adjusted under 35 U.S.C. 154(b) by 0 days.

(21) Appl. No.: 09/511,391

(22) Filed: Feb. 23, 2000

(30) Foreign Application Priority Data

Oct. 22, 1999 (JP) .......................................... 11-301380

(51) Int. Cl.$^7$ .............................................. G05B 19/18
(52) U.S. Cl. ...................... 700/58; 700/166; 219/121.6; 219/121.78; 219/121.82
(58) Field of Search .............. 700/58, 166; 219/121.68, 219/121.6, 121.78, 121.82; 347/225, 247; 358/1.7, 3.6

(56) References Cited

U.S. PATENT DOCUMENTS

| | | | | |
|---|---|---|---|---|
| 4,818,835 A | * | 4/1989 | Kuwabara et al. | 219/121.6 |
| 5,021,631 A | * | 6/1991 | Ravellat | 219/121.68 |
| 5,566,277 A | * | 10/1996 | Hideshima et al. | 358/1.16 |
| 5,734,412 A | * | 3/1998 | Hasebe et al. | 347/247 |
| 5,966,307 A | * | 10/1999 | Lin | 700/159 |
| 6,066,829 A | * | 5/2000 | Ishikawa | 219/121.68 |
| 6,130,402 A | * | 10/2000 | Abella et al. | 219/121.68 |
| 6,239,406 B1 | * | 5/2001 | Onoma et al. | 219/121.82 |

FOREIGN PATENT DOCUMENTS

| | | | | |
|---|---|---|---|---|
| EP | 883277 A2 | * | 9/1998 | H04N/1/47 |
| JP | 05293678 A | * | 11/1993 | B32K/26/08 |
| JP | 7-33475 | | 6/1995 | B23K/26/00 |
| JP | 7-33476 | | 6/1995 | B23K/26/00 |
| JP | 11-285586 | | 2/1999 | B23K/26/00 |

* cited by examiner

Primary Examiner—Thomas Black
Assistant Examiner—Crystal J. Barnes
(74) Attorney, Agent, or Firm—Wenderoth, Lind & Ponack, L.L.P.

(57) ABSTRACT

A laser marker scanning laser beams to print a mark on an object includes a laser oscillator producing laser beams, an input device designating a mark to be printed, a galvanometer scanner successively receiving coordinate data corresponding to a predetermined location on the object, the galvanometer scanner scanning the laser beams produced from the laser oscillator toward the predetermined location on the object on the basis of the coordinate data, a memory storing sets of coordinate data of a multitude of locations on the object, the locations dividing a component line of each of marks which can be designated by the input device, and a control device successively delivering the coordinate data concerning the mark designated by the input device from the memory to the galvanometer scanner.

8 Claims, 10 Drawing Sheets

PRIOR ART

LASER MARKER

BACKGROUND OF THE INVENTION

1. Field of the Invention

The present invention relates to a laser marker moving irradiation points of laser beams using a galvanometer scanner and printing a desired mark composed of characters, figures and/or symbols on an object on the basis of movement loci of the irradiation points.

2. Description of the Prior Art

FIG. 8 shows a conventional laser marker of the above-described type. The shown laser marker comprises a laser oscillator 10 producing laser beams, a galvanometer scanner 11 including a pair of galvanometer mirrors 12a and 12b reflecting the laser beams produced from the laser oscillator 10, and a condensing lens 15 condensing the reflected laser beams so that the laser beams are irradiated onto an object on which a mark is to be printed. Electric motors 13a and 13b are provided for changing angles of reflection of the mirrors 12a and 12b respectively. The laser beam is scanned horizontally in FIG. 8 or in the X direction by the mirror 12a, whereas the laser beam is scanned in the Y direction generally perpendicular to the X direction by the mirror 12b. A control device 14 is provided for controlling the angles of reflection of the mirrors 12a and 12b and the laser oscillator 10 so that the same is turned on and off. The control device 14 comprises a CPU 20 as a main component thereof as shown in FIG. 9. A memory 21 and an input device 22 are connected to the CPU 20.

The memory 21 stores graphic data concerning marks which can be designated prior to start of a printing operation and data of predetermined computing expressions or formulas. The graphic data includes coordinate data concerning both end points of respective component lines of each mark. More specifically, for example, graphic data of mark "A" includes coordinate data of end points T1 to T5 of component lines L1, L2 and L3, as shown in FIG. 10A. Furthermore, the computing expressions include those for obtaining subdivided points and those for obtaining compensation. The computing expressions for subdivided points are provided for obtaining coordinate data of a plurality of locations obtained by subdividing the component lines of the mark on the object on the basis of coordinate data of the graphic data. For example, concerning the mark "A," coordinate data of a plurality of locations (points P1, P2, P3, and so on in FIG. 10A) is obtained by subdividing the component lines L1 to L3 as shown in FIG. 10A. The computing expressions for compensation are used to compensate the distortion of the laser beam due to an aberration of the lens 15.

The character "A" is designated by the input device 22 when it is to be printed by the conventional laser marker. The CPU 20 of the control device 14 then carries out the following steps 1 to 4:

Step 1: The CPU 20 retrieves graphic data concerning a plurality of marks stored in the memory 21 to input the graphic data (coordinate data of end points T1 to T5) corresponding to the designated mark "A."

Step 2: The CPU 20 reads out the computing expressions for subdivided points from the memory 21 to compute coordinate data of a plurality of locations subdividing the component lines L1, L2 and L3 of the mark "A" on the basis of the coordinate data of end points T1 to T5.

Step 3: The CPU 20 reads out the computing expressions for compensation from the memory 21 to compensate distortion in the coordinate data of a plurality of the locations on the basis of the read expressions.

Step 4: The CPU 20 delivers the compensated coordinate data to the galvanometer scanner 11 cyclically for a predetermined period and further delivers an on-off signal to the laser oscillator 10.

Upon receipt of the coordinate data, the galvanometer scanner 11 scans irradiation points of the laser light produced from the laser oscillator 10 in such a manner that locations indicated by a series of coordinate data are connected together. As a result, the irradiation points are moved in the direction of arrow in FIG. 10B so that the desired mark "A" is printed on the object W. Japanese Unexamined Patent Application Publication No. 11-28586 (1999) discloses a laser marker of the type described above.

In the conventional laser marker, the memory stores only the coordinate data concerning the end points of the component lines of each mark as the data of marks which can be designated. Accordingly, the coordinate data is generated during the printing operation as described above. As a result, a printing speed cannot be increased so high since the CPU 20 (control device 14) needs to ensure a time for generation of coordinate data. Provision of the control device with the CPU of high processing speed type can increase the printing speed. However, the cost for the laser marker is increased with improvement in the performance of the CPU.

SUMMARY OF THE INVENTION

Therefore, an object of the present invention is to provide a laser marker which can increase the printing speed without a large increase in the cost.

The present invention provides a laser marker scanning laser beams to print a mark on an object, the laser marker comprising a laser oscillator producing laser beams, an input device designating a mark to be printed, a galvanometer scanner successively receiving coordinate data corresponding to a predetermined location on the object, the galvanometer scanner scanning the laser beams produced from the laser oscillator toward the predetermined location on the object on the basis of the coordinate data, a memory storing sets of coordinate data of a multitude of locations on the object, the locations dividing a component line of each of marks which can be designated by the input device, and a control device successively delivering the coordinate data concerning the mark designated by the input device from the memory to the galvanometer scanner.

According to the aforesaid laser marker, the memory stores the sets of coordinate data of a multitude of the locations obtained by dividing the component line of each of the marks on the object with respect to all the marks which can be designated by the input device. Accordingly, the control device need not generate coordinate data during the printing operation and merely delivers the coordinate data from the memory to the galvanometer scanner. Thus, since the conventionally required coordinate data generating time is unnecessary, the coordinate data can be supplied to the galvanometer scanner in a shorter period. Consequently, the printing speed of the laser marker can be improved without a cost increase due to an improvement in the data processing performance of the control device.

BRIEF DESCRIPTION OF THE DRAWINGS

Other objects, features and advantages of the present invention will become clear upon reviewing the following description of the preferred embodiments, made with reference to the accompanying drawings, in which.

DETAILED DESCRIPTION OF THE PREFERRED EMBODIMENTS

Figure 1:
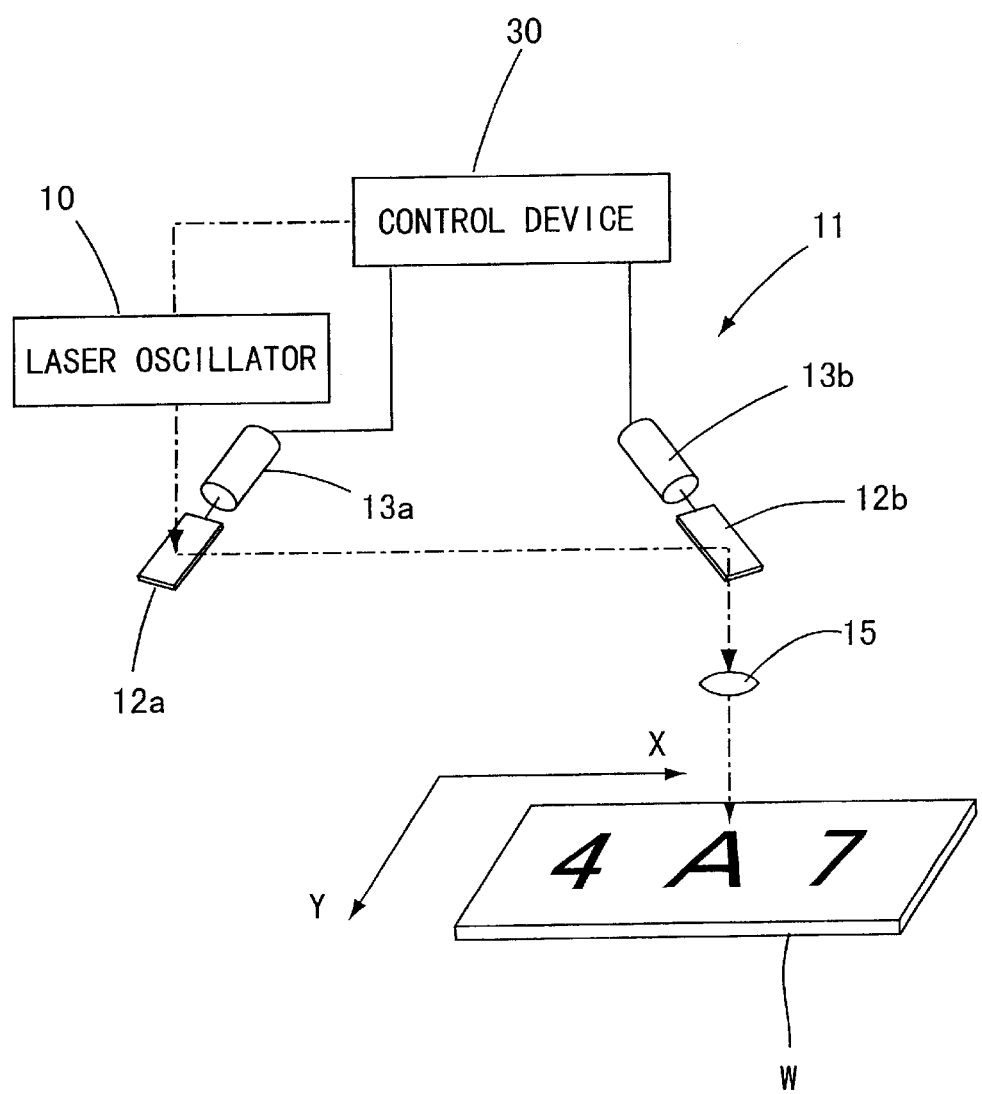
FIG. 1 is a schematic of a laser marker of a first embodiment in accordance with the present invention.

A first embodiment of the present invention will be described with reference to FIGS. 1 to 5. The laser marker of the embodiment prints a mark composed of the maximum of three-digit alphanumeric characters in the invention. Referring to FIG. 1, the laser marker comprises a laser oscillator 10 producing laser beams, a galvanometer scanner 11 including a pair of galvanometer mirrors 12a and 12b reflecting the laser beams produced from the laser oscillator 10, and a condensing lens 15 disposed between the mirror 12b of the galvanometer scanner 11 and an object W on which a mark is to be printed. The lens 15 condenses the reflected laser beams so that the laser beams are irradiated onto the object W.

Figure 2:
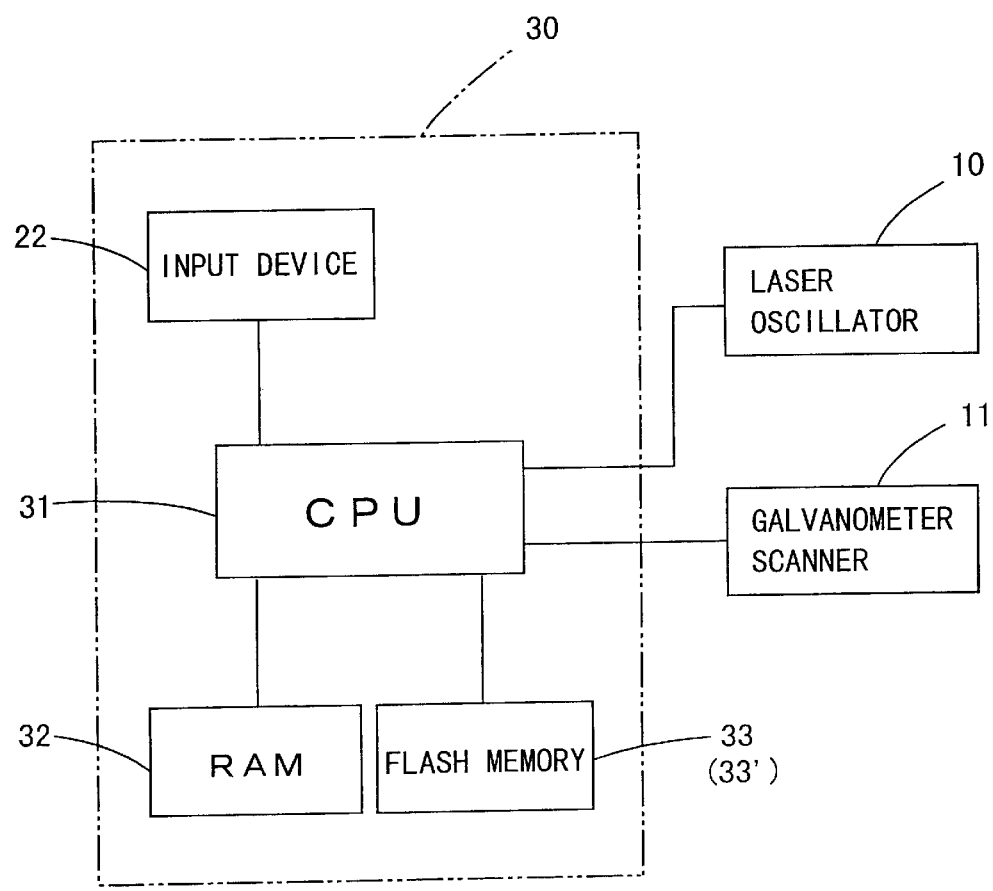
FIG. 2 is a schematic block diagram showing an electrical arrangement of the laser marker.

Electric motors 13a and 13b are provided for changing angles of reflection of the mirrors 12a and 12b respectively. The laser beam is scanned horizontally in FIG. 1 or in the X direction by the mirror 12a, whereas the laser beam is scanned in the Y direction generally perpendicular to the X direction by the mirror 12b. A control device 30 is provided for controlling the angles of reflection of the mirrors 12a and 12b and the laser oscillator 10 so that the latter is turned on and off. The control device 30 comprises a CPU 31, a RAM 32 and a flash memory 33 as shown in FIG. 2. The RAM 32 constitutes a temporary memory mainly used when the CPU 30 executes computation.

The flash memory 33 stores coordinate data concerning the maximum of three-digit alphanumeric characters which can be printed on the surface of the object W. The three-digit alphanumeric characters are put into a rectangular area define by coordinates X=X1 to X300 and coordinates Y=Y1 to Y200 within an area in which the galvanometer scanner 11 can scan irradiation points of laser beams, as shown. in FIG. 3. The three-digit alphanumeric characters are to be arranged in the X direction. More specifically, an area defined by the coordinates X=X1 to X100 is allocated to a first digit. An area defined by the coordinates X=X101 to X200 is allocated to a second digit. An area defined by the coordinates X=X201 to X300 is allocated to a third digit. Any one of 37 alphanumeric characters is printed: for each digit. The 37 alphanumeric characters include 10 numerals from 0 to 9, and the English alphabets of A to Z and the void. Since the X coordinates differ from one digit to another, 37 coordinate data concerning the alphanumeric character printed at each digit are provided for each digit. The flash memory 33 stores 111 (37×3) sets of the coordinate data.

The coordinate data set corresponding to each alphanumeric character is obtained by dividing each component line on the object W so that coordinate data of a multitude of locations is obtained and further by compensating distortion due to the optical system of the laser marker. More specifically, the coordinate data generated and compensated by the conventions laser marker during the printing operation is previously generated and compensated in the embodiment. The coordinate data set is stored in the flash memory 33 for every alphanumeric character. An end mark "FF" is attached to a final one of plurality of coordinate data corresponding to the respective alphanumeric characters. Further, a code number is assigned to each one of the coordinate data sets of the respective alphanumeric characters. Each coordinate data set is stored at a predetermined address of a memory area of the flash memory 33 so as to correspond to the code number thereof. Code numbers 1 to 37 are assigned to 37 alphanumeric characters respectiveley to be printed for the first digit. Code numbers 38 to 74 are assigned to 37 alphanumeric characters respectively to be printed for the second digit. Code numbers 75 to 111 are assigned to 37 alphanumeric characters respectively to be printed for the third digit.

Figure 4:
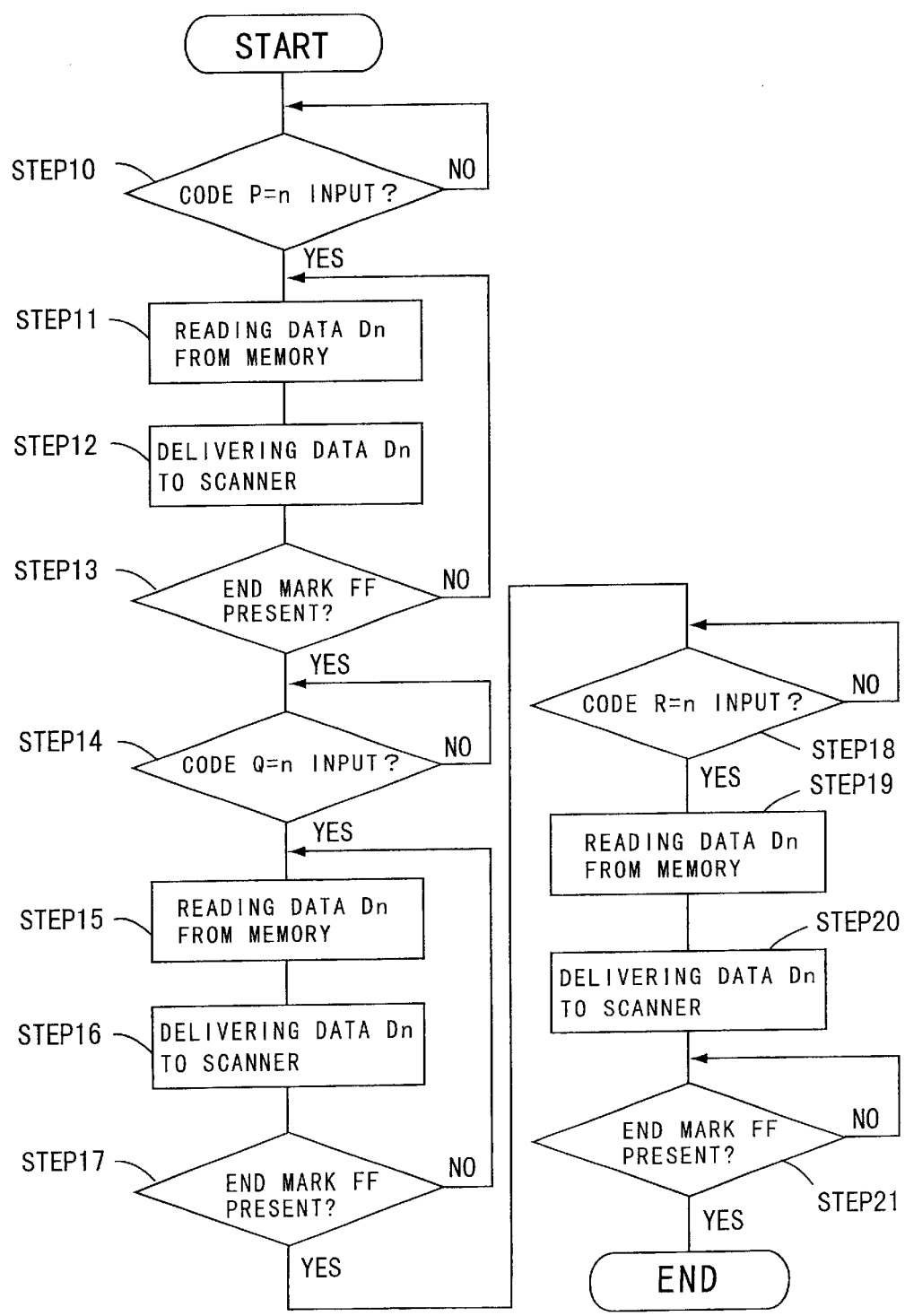
FIG. 4 is a flowchart showing the operation of a CPU.
Figure 5:
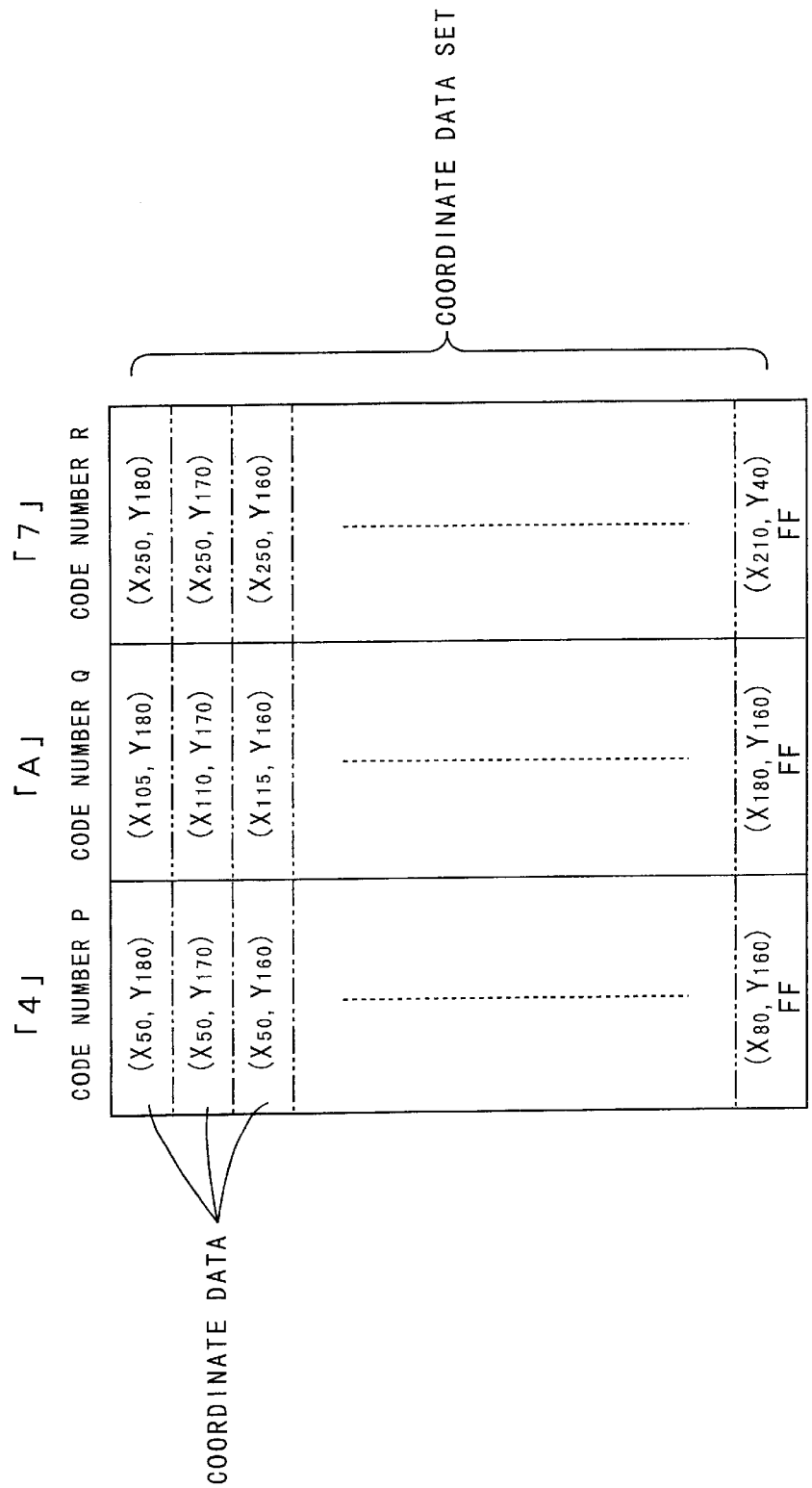
FIG. 5 is a schematic of coordinate data.

The operation of the laser marker will now be described with reference to FIGS. 4 and 5. The object is set on a preselected jig (not shown) and a power switch (not shown) of the laser marker is turned on. The CPU 31 is then on standby for input of an alphanumeric character to be printed for the first digit in the printing area at STEP 10. In this case, a display (not shown) provided in the control device 30 may display a message, for example, "Please input a character to be printed for first digit." When, for example, an alphanumeric character "4" is input by the input device 22, the CPU 31 receives an input signal and takes in the code number corresponding to the alphanumeric character "4" as a code number P. The CPU 31 then fetches the coordinate data stored at the predetermined address corresponding to the code number P from the memory area of the flash memory 33 at STEP 11. The CPU 31 further delivers the coordinate data to the galvanometer scanner 11 at STEP 12.

Figure 3:
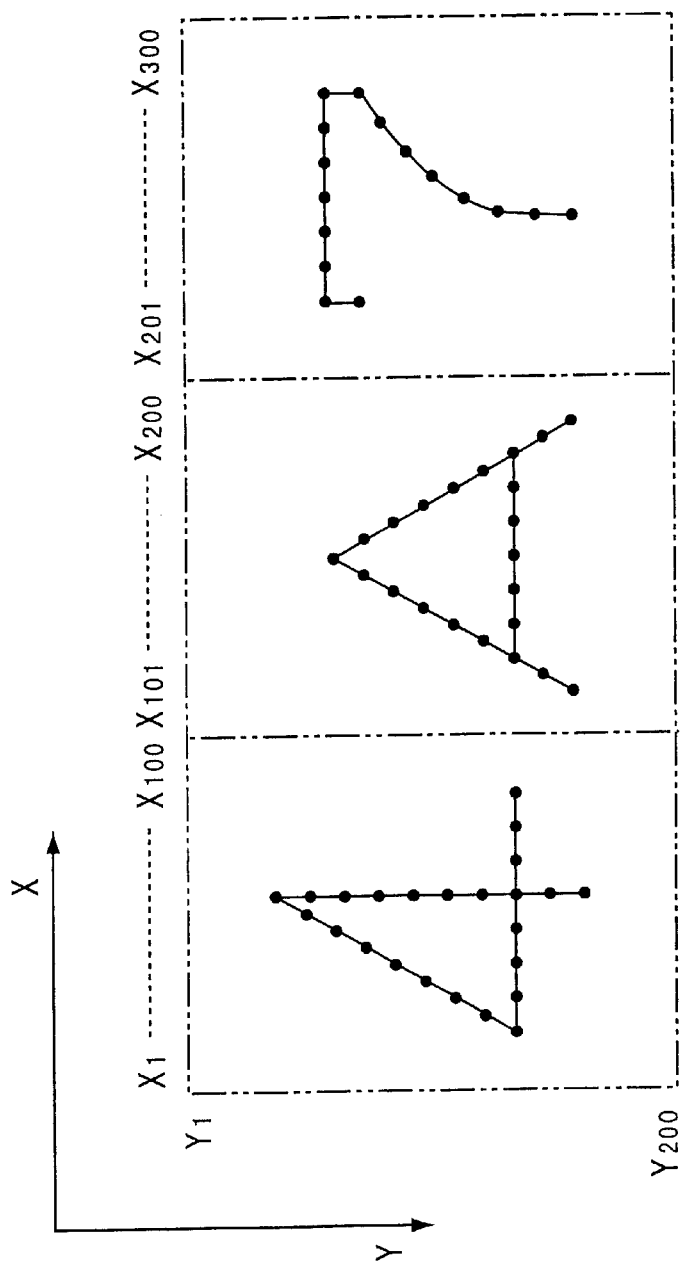
FIG. 3 is a schematic of a printing area.

The CPU 31 checks the presence of the end mark "FF" in the fetched coordinate data at STEP 13. The CPU 31 determines in the negative at STEP 13 when the end mark "FF" is not attached. The CPU 31 increments an address counter (not shown), returning to STEP 11 to fetch the coordinate data stored at a subsequent address following the aforesaid one and deliver the fetched coordinate data to the galvanometer scanner 11. Thereafter, the above-described operation is repeated until the coordinate data with the end mark "FF" attached thereto is fetched, so that the coordinate data is delivered to the galvanometer scanner 11 in a predetermined period or cycle. At the same time, an on-off signal is supplied to the laser oscillator 10 so that its drive is initiated. As a result, laser beams are produced from the laser oscillator 10. Further, points of irradiation of the laser beams are scanned by the galvanometer scanner 10 so that locations indicated by the series of coordinate data are connected together. Consequently, the numeral "4" is printed in the area defined by the coordinates X1 to X100 and Y1 to Y200 as shown in FIG. 3.

The flash memory 33 stores the coordinate data sets of a plurality of the locations obtained by dividing the component line of each of all the marks that can be designated, which coordinate data sets are compensated with respect to the distortion of the laser beam due to the optical system. Accordingly, the CPU 31 need not generate and compensate the coordinate data during the printing operation and is only required to deliver the coordinate data from the flash memory 33 to the galvanometer scanner 11. That is, since the conventionally required time for generation and compensation of the coordinate data is not required, the coordinate data can be delivered to the galvanometer scanner 11 in a shorter period or cycle. Consequently, the printing speed of the laser marker is set to be higher, so that the mark (alphanumeric character) can be printed in a shorter time.

At STEP 14, the CPU 31 is on standby for input of an alphanumeric character to be printed for the second digit in the printing area. For example, when the alphanumeric character, "A" is input, the CPU 31 takes in the code number corresponding to the alphanumeric character, "A" as a code number Q. Subsequently, the same processing is carried out as in the case where the first digit is printed so that the alphanumeric character "A" is printed. Further, an alphanumeric character is printed at the third digit in the same manner as described above. Thus, the printing operation of the laser marker is completed.

According to the foregoing embodiment, the control device 30 (CPU 31) need not generate and compensate the coordinate data duringthe printing operation. The control device 30 can deliver the coordinate data to the galvanometer scanner 11 in the shorter period. Consequently, the printing speed of the laser market can be improved. Moreover, the improvement in the printing speed is achieved without requirement of higher performance of the CPU 31 by addition of the flash memory 33 which can be obtained at a low cost. Consequently, an increase in the cost of the overall laser marker can be prevented.

Figure 6:
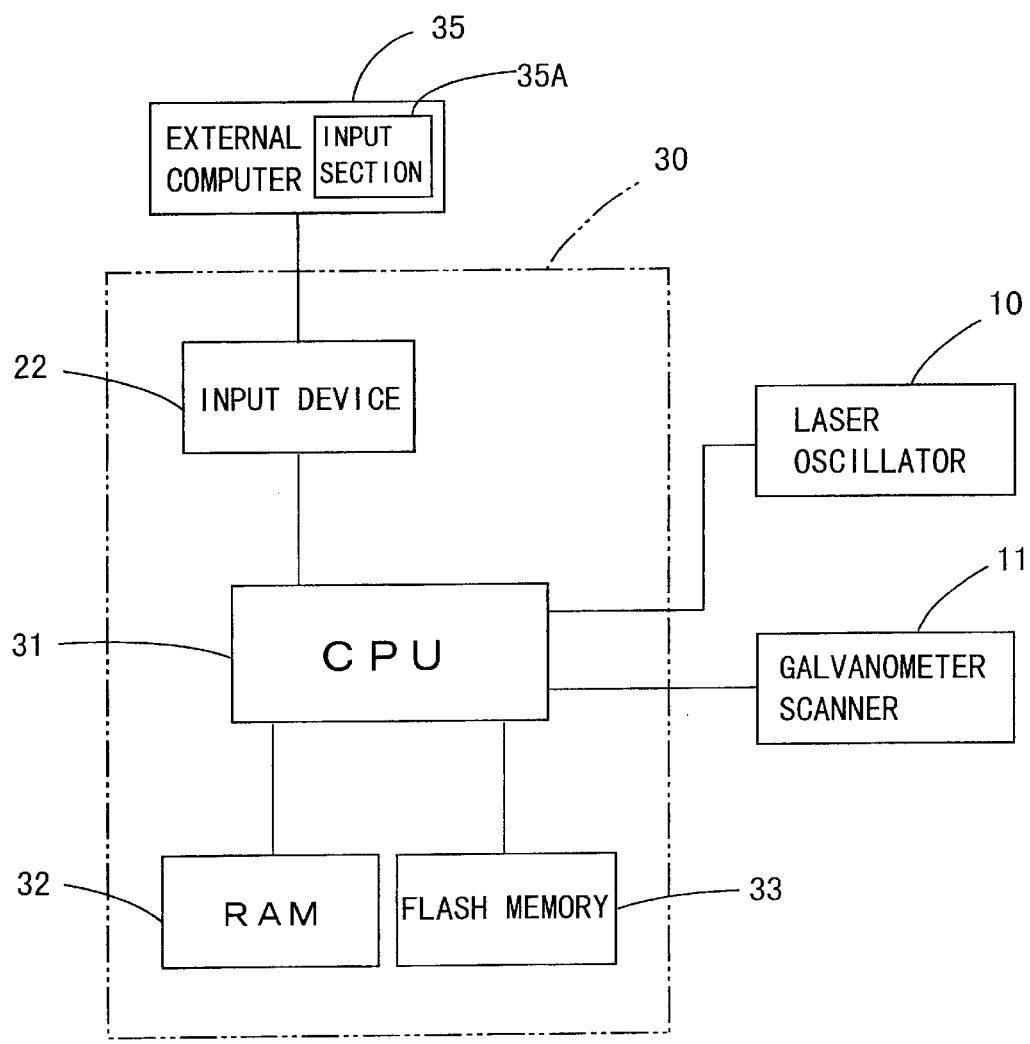
FIG. 6 is a schematic block diagram showing an electrical arrangement of the laser marker of a second embodiment in accordance with the invention.

FIG. 6 illustrates a second embodiment of the invention. In the second embodiment, an external computer 35 such as a personal computer is detachably connected to the input device 22 employed in the laser marker of the first embodiment. The external computer 35 includes an input section 35A at which the user inputs a desired mark. The external computer 35 then generates and compensates each coordinate data set with respect to the mark. Further, frequently-used printing conditions including font, character pitch and print start coordinates are selected. The aforesaid coordinate data sets are delivered from the external computer 35 via the input device 22 to the CPU 31 of the control device 30 to be written onto the flash memory 33.

According to the second embodiment, the external computer 35 is detachably connected to the laser marker so that the generated and compensated coordinate data sets are written onto the flash memory 33. Accordingly, a plurality of laser markers can jointly use the external computer 35, for example, so that coordinate data sets concerning new marks can readily be added and compensated at low cost. Further, since the flash memory 33 storing the coordinate data is a non-volatile memory, the coordinate data stored therein is not lost even when power to the laser marker is turned off.

Figure 7:
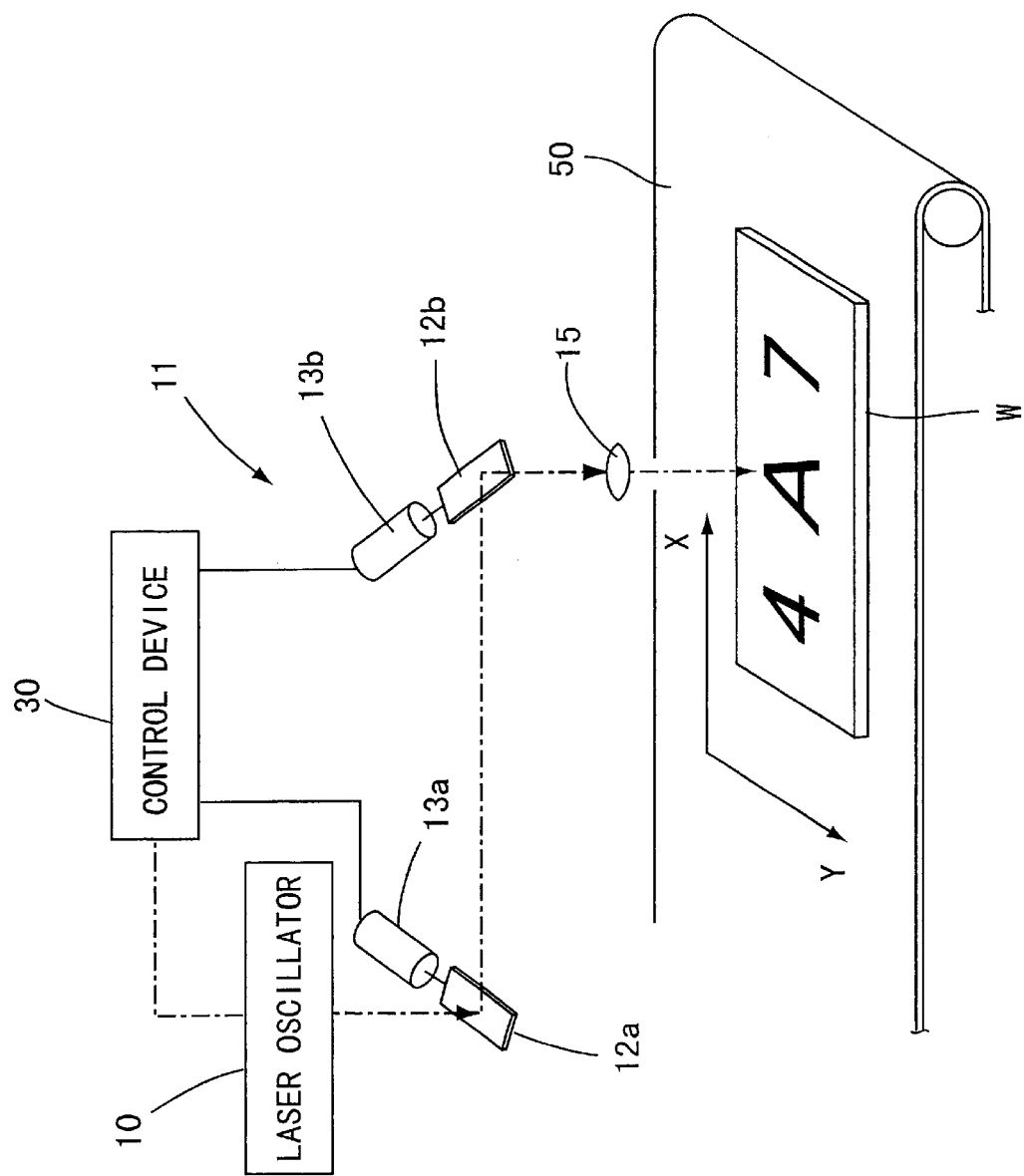
FIG. 7 is a schematic block diagram showing an electrical arrangement of the laser marker of a third embodiment in accordance with the invention.
Figure 8:
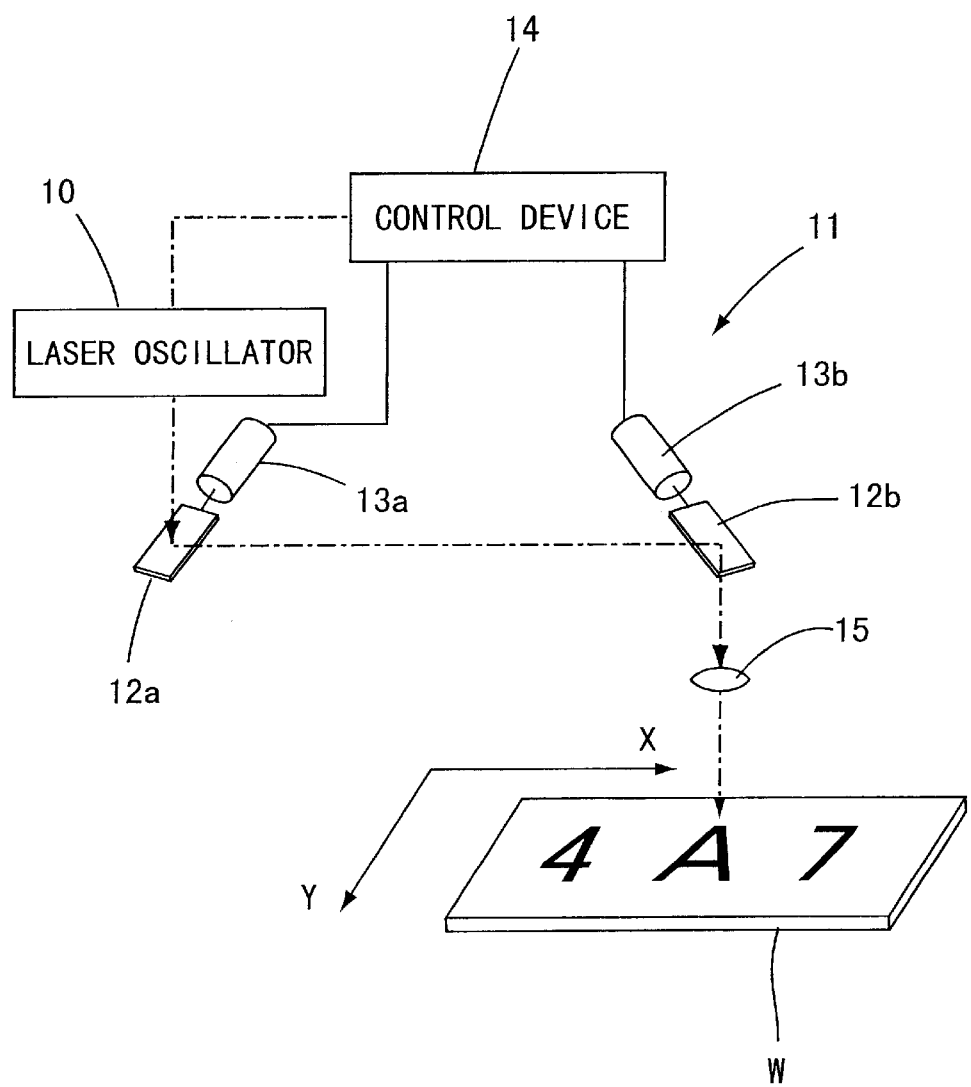
FIG. 8 is a schematic of a conventional laser marker.
Figure 9:
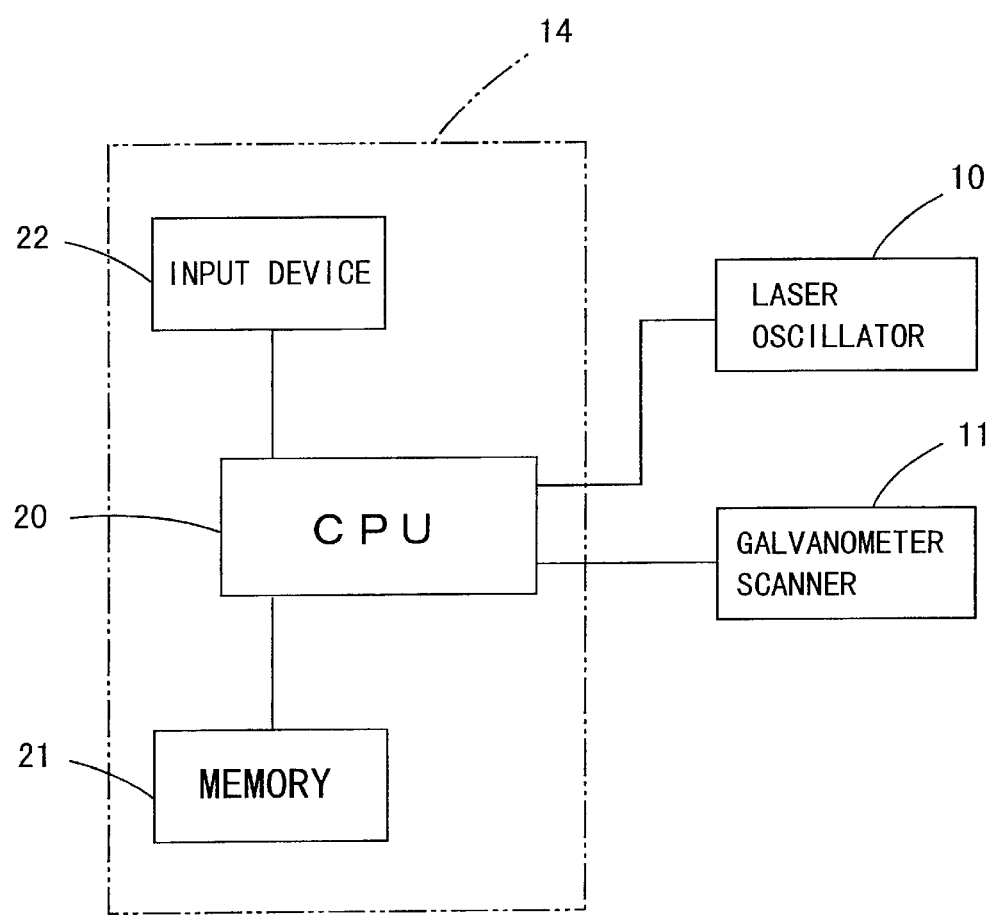
FIG. 9 is a schematic block diagram showing an electrical arrangement of the conventional laser marker.
Figure 10:
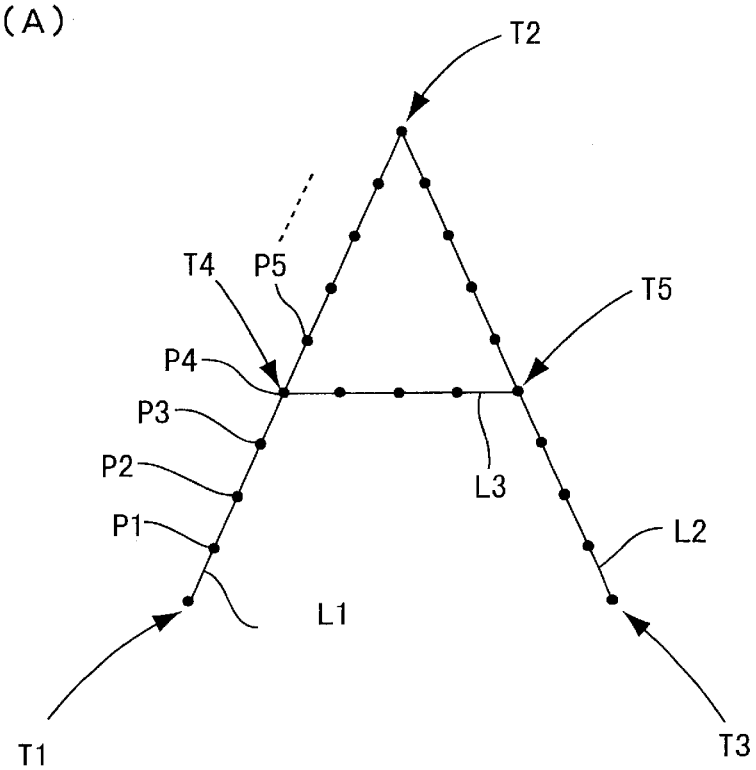
FIG. 10A is a schematic of locations of points corresponding to coordinate data.
FIG. 10B is a schematic showing movement directions of irradiation points of laser beams.
Figure 10:
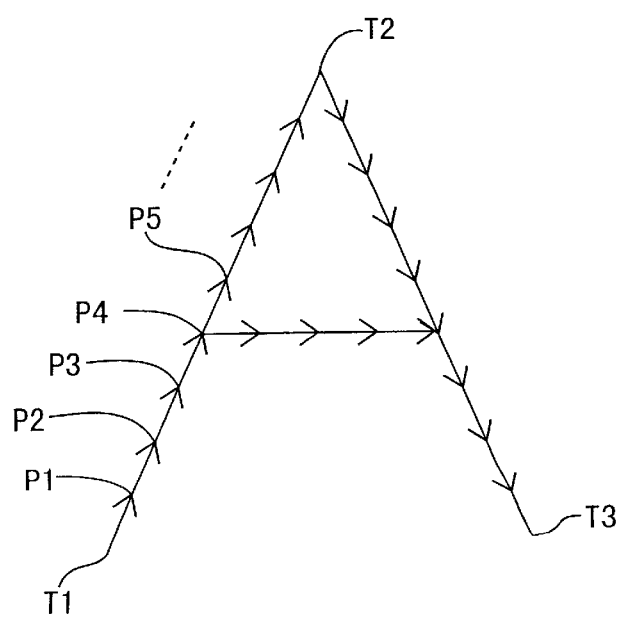

FIG. 7 illustrates a third embodiment of the invention. In the third embodiment, the laser marker having the same basic constitution as that of the first embodiment is installed in the middle of a conveyance line 50 so that the mark is printed on the object during its movement. The laser marker is provided with a flash memory 33 as shown in FIG. 2. The flash memory 33 stores coordinate data sets containing the compensation for displacement of the object W due to conveyance on the conveyance line as well as the coordinate data as stored in the flash memory 33 in the first embodiment. The control device 30 includes a mode change-over switch (not shown) switching the laser marker between an input mode and a printing mode.

When the input mode has been selected, the CPU 31 is on standby for input of a three-digit alphanumeric character. For example, a three-digit alphanumeric mark, "4A7" is input by the input device 22. The CPU 31 then stores a code number corresponding to a first digit, "4" as a code number P at a predetermined register in a storage area of a RAM 32. The CPU 31 further stores a code number corresponding to a second digit, "A" as a code number Q and a code number corresponding to a third digit, "7" as a code number R.

The laser marker is then switched to the printing mode and the conveyance line is turned on. The object W is conveyed on the conveyance line. When the object W passes a predetermined location, a sensor (not shown) detects the passing of the object W, thereby delivering a trigger signal to the control device 30. The CPU 31 of the control device 30 fetches out the coordinate data from the flash memory 33'. Since the flash memory 33' stores the coordinate data sets each containing correction with respect to a moving speed on the conveyance line, the CPU 31 merely delivers the coordinate data from the flash memory 33' to the galvanometer scanner 11 such that the coordinate data can be supplied to the galvanometer mirror 11 in the shorter period.

Consequently, the laser marker can be set at a higher printing speed so that for example, the alphanumeric character can be printed in a short period of time.

The coordinate data is generated under a single printing condition in the foregoing embodiments. However, coordinate data may be generated under various printing conditions to be stored, instead. As a result, the mark can be printed under various conditions.

The alphanumeric character is printed in the foregoing embodiments. However, figures, two-dimensional codes, etc. may be printed by the laser marker of the present invention, instead.

The flash memory 33 is provided for storing the coordinate data in the foregoing embodiments. A non-volatile memory such as the flash memory need not be provided. A volatile memory such as a RAM may be used instead of the non-volatile memory.

The condensing lens 15 is disposed between the mirror 12b of the galvanometer scanner 11 and the object W in the foregoing embodiments. However, the lens may be disposed between the galvanometer scanner 11 and the laser oscillator 10, instead. Further, two lens may be provided between the mirror 12b and the object W and between the galvanometer scanner 11 and the laser oscillator 10 respectively.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A laser marker for scanning laser beams to print a mark on an object, said laser marker comprising:
   a laser oscillator operable to produce laser beams;
   an input device operable to designate a mark to be printed;
   a memory capable of storing sets of coordinate data of a multitude of locations on the object, the locations dividing a component line of each of marks that can be designated by the input device;

a galvanometer scanner; and a control device operable to successively deliver coordinate data concerning the mark designated by said input device from said memory to said galvanometer scanner, wherein said galvanometer scanner is operable to successively receive coordinate data from said control device and scan the laser beams produced from said laser oscillator toward the predetermined location on the object on the basis of the coordinate data.

2. The laser marker according to claim 1, further comprising an external computer detachably connected to said input device and having an input section, said external computer being operable to generate sets of coordinate data concerning the mark when data of a desired mark is supplied to said input section, wherein said control device is operable to write onto said memory the coordinate data sets generated by said external computer.

3. A laser marker for scanning laser beams to print a mark on an object, the laser marker comprising:

a laser oscillator operable to produce laser beams;

an input device operable to designate a mark to be printed;

a galvanometer scanner;

a lens provided between said galvanometer scanner and said laser oscillator and/or between said galvanometer scanner and the object for condensing the laser beams scanned by said galvanometer scanner;

a memory capable of storing sets of coordinate data of a multitude of locations on the object, the locations dividing a component line of each of marks that can be designated by said input device, the coordinate data sets being previously compensated with respect to distortion of the laser beams due to said lens; and a control device operable to successively deliver the coordinate data concerning the mark designated by said input device from said memory to said galvanometer scanner, wherein said galvanometer scanner is operable to successively receive coordinate data from said control device and scan the laser beams produced from said laser oscillator toward the predetermined location on the object on the basis of the coordinate data.

4. The laser marker according to claim 3, further comprising an external computer detachably connected to said input device and having an input section, said external computer being operable to generate sets of coordinate data concerning the mark when data of a desired mark is supplied to said input section, wherein said control device is operable to write onto said memory the coordinate data sets generated by said external computer.

5. A laser marker for use with a conveyance line and for scanning laser beams to print a mark on an object moved along the conveyance line, said laser marker comprising:

a laser oscillator operable to produce laser beams;

an input device operable to designate a mark to be printed;

a galvanometer scanner;

a lens provided between said galvanometer scanner and said laser oscillator and/or between said galvanometer scanner and the object for condensing the laser beams scanned by said galvanometer scanner;

a memory capable of storing sets of coordinate data of a multitude of locations on the object, the locations dividing a component line of each of marks that can be designated by said input device, the coordinate data sets being previously compensated with respect to distortion of the laser beams due to said lens and with respect to displacement of the object due to conveyance on the conveyance line; and a control device operable to successively deliver the coordinate data concerning the mark designated by said input device from said memory to said galvanometer scanner, wherein said galvanometer scanner is operable to successively receive coordinate data from said control device and scan the laser beams produced from said laser oscillator toward the predetermined location on the object on the basis of the coordinate data.

6. The laser marker according to claim 5, further comprising an external computer detachably connected to said input device and having an input section, said external computer being operable to generate sets of coordinate data concerning the mark when data of a desired mark is supplied to said input section, wherein said control device is operable to write onto said memory the coordinate data sets generated by said external computer.

7. An apparatus comprising:

a conveyance line operable to convey an object;

a laser oscillator operable to produce laser beams;

an input device operable to designate a mark to be printed;

a galvanometer scanner;

a lens provided between said galvanometer scanner and said laser oscillator and/or between said galvanometer scanner and the object for condensing the laser beams scanned by said galvanometer scanner;

a memory capable of storing sets of coordinate data of a multitude of locations on the object, the locations dividing a component line of each of marks that can be designated by said input device, the coordinate data sets being previously compensated with respect to distortion of the laser beams due to said lens and with respect to displacement of the object due to conveyance on said conveyance line; and a control device operable to successively deliver the coordinate data concerning the mark designated by said input device from said memory to said galvanometer scanner, wherein said galvanometer scanner is operable to successively receive coordinate data from said control device and scan the laser beams produced from said laser oscillator toward the predetermined location on the object on the basis of the coordinate data, and wherein said laser oscillator, said input device, said galvanometer scanner, said memory, and said control device are disposed in the middle of said conveyance line so as to scan laser beams to print a mark on the object conveyed along the conveyance line.

8. The apparatus according to claim 7, further comprising an external computer detachably connected to said input device and having an input section, said external computer being operable to generate sets of coordinate data concerning the mark when data of a desired mark is supplied to said input section, wherein said control device is operable to write onto said memory the coordinate data sets generated by said external computer.

* * * * *